P. H. THOMAS.
MOTOR CONTROL SYSTEM.
APPLICATION FILED SEPT. 4, 1903.

945,008.

Patented Dec. 28, 1909.

Witnesses
Chas. F. Clagett
W. H. Capel

Inventor
Percy H. Thomas.
By his Attorney
Charles A. Terry

UNITED STATES PATENT OFFICE.

PERCY H. THOMAS, OF PITTSBURG, PENNSYLVANIA, ASSIGNOR TO COOPER HEWITT ELECTRIC COMPANY, A CORPORATION OF NEW YORK.

MOTOR-CONTROL SYSTEM.

945,008. Specification of Letters Patent. Patented Dec. 28, 1909.

Application filed September 4, 1903. Serial No. 171,882.

*To all whom it may concern:*

Be it known that I, PERCY H. THOMAS, a citizen of the United States, and resident of Pittsburg, county of Allegheny, State of Pennsylvania, have invented certain new and useful Improvements in Motor-Control Systems, of which the following is a specification.

The object of this invention is to provide economical and simple means for gradually accelerating a direct current motor which is supplied with power from an alternating current source. As is well known, it is possible to obtain gradual acceleration in such motors by the use of groups or steps of series resistances. This method is, however, uneconomical and requires resistances of considerable bulk. When this mode of acceleration is employed, the energy consumed by the resistances represents a cutting down of the total energy of the circuit and consequently stands for a practical waste of energy inasmuch as the resistances contribute nothing to the active operation of the system. Under the operation of the invention disclosed herein, this waste is avoided. Practically the total energy of the circuit at any given time is applied to the operation of the motor, and the desired acceleration of the motor is accomplished by applying to it successively larger and larger amounts of electrical energy, none of which is wasted.

In carrying out my invention, I make use, among other things, of a so-called vapor converter adapted to transform alternating into direct currents. Incidentally the vapor converter employed may be provided with one or more additional or supplementary positive electrodes. I supply to the motor a gradually varying direct current potential from an alternating source, preferably from intermediate points of a transformer, the arrangement being such that during successive periods of operation successively higher and higher potentials are applied to the motor through the action of a suitable switch.

I have illustrated my invention in the accompanying drawings, in which—

Figure 1:
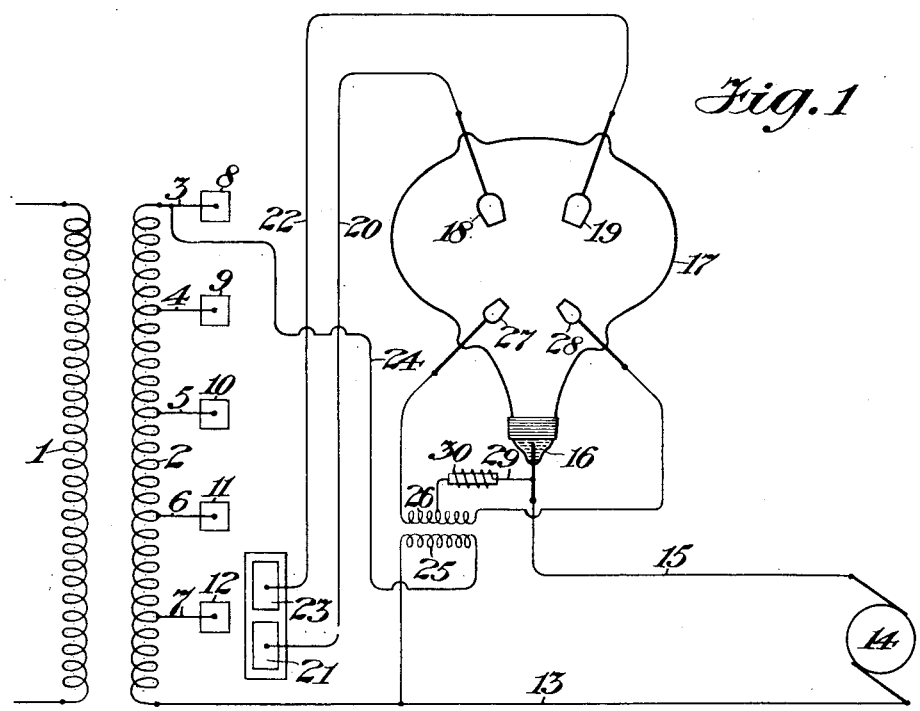
Figure 2:
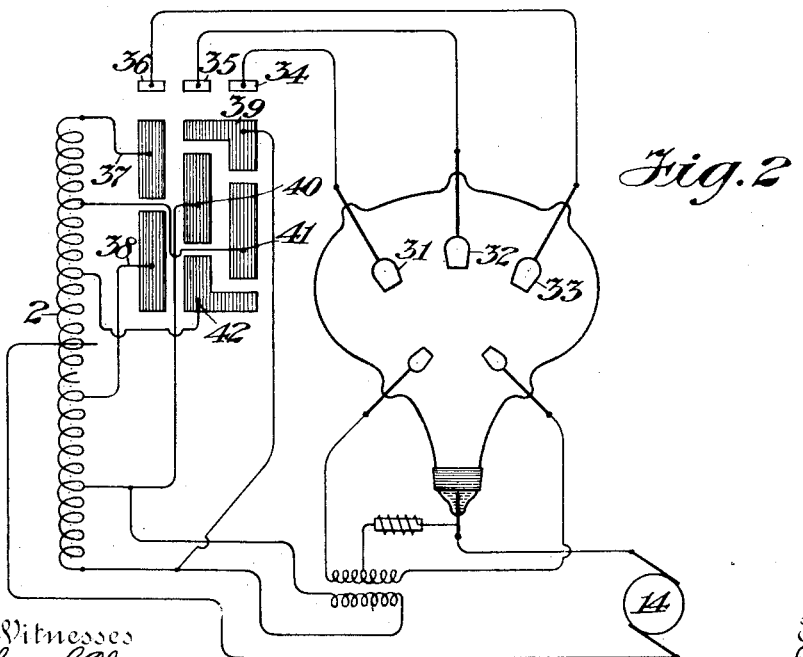

Figures 1 and 2 are diagrams of circuits and apparatus adapted to carry out my invention.

In the drawings, 1 is the primary of a suitable transformer supplied from an alternating current source.

The secondary of the transformer is shown at 2 as having taps 3, 4, 5, 6 and 7, connected, respectively, to switch terminals 8, 9, 10, 11 and 12. From one extremity of the transformer a wire 13 leads to one side of the work circuit including a direct current motor 14. The other side, 15, of the work circuit is connected to the negative electrode, 16, of a vapor converter, 17, the said converter being provided with two positive electrodes, 18 and 19. The electrode 18 is connected by a conductor, 20, with a switch terminal, 21, and the electrode 19 is connected by a conductor, 22, with a switch terminal, 23.

The terminals 21 and 23 are adapted to coöperate with the described terminals 8, 9, 10, 11 and 12, any suitable device being provided whereby relative movement between these sets of terminals can be obtained. It should, however, be stated that the terminal devices referred to are so proportioned that during their relative movement the terminal 23, for example, will make contact with the terminal 11 before the terminal 21 leaves the terminal 12, and also that the terminal 21 will make contact with the terminal 11 before the terminal 23 leaves the same. This same relation holds with respect to the members of any successive pair in the group of terminals 8, 9, 10, 11 and 12.

Across the terminals of the main transformer a circuit, 24, is placed, the same including the primary, 25, of a transformer, the secondary, 26, of which is connected to auxiliary positive electrodes, 27 and 28, inside the vapor converter 17. At an intermediate point in the secondary 26 a conductor, 29, leads to the negative electrode 16 of the converter. In the conductor 29 I may include a choke coil, 30, the function of which is to store electrical energy during a rise of potential in the circuit and to discharge a portion of the stored energy during a fall of potential, whereby the negative electrode 16 is maintained at all times in an operative condition.

The operation of the system thus far described is as follows: The direct current motor 14 is started from rest by so operating the switch terminals 21 and 23 that the terminal 23 makes contact with the terminal 12, which is the lowest voltage tap provided from the secondary 2 of the main transformer. This applies the alternations from this transformer in a given direction to the motor 14, these accumulations of electrical energy being supplied at the lowest voltage attainable from the apparatus. To accelerate the motor, the switch terminals 21 and 23 are moved upward, the terminal 21 making contact with the terminal 12 before the terminal 23 leaves the terminal 12, thus running both positive electrodes 18 and 19 in parallel upon the tap 7. As the switch terminals move farther, the terminal 23 leaves the tap 7 leaving the terminal 18 to carry the current. A moment later, the terminal 23 makes contact with the terminal 11 of the tap 6, which is the tap on the next higher voltage, when the positive electrode 19 immediately supplies current to the direct current motor 14 at the voltage of the tap 6. The positive electrode 18, though still connected to the tap 7, no longer supplies current to the motor 14, since the tendency is for current to flow from the electrode 19 to the electrode 18. No current actually flows, however, into the electrode 18 in view of the initial reluctance characteristic of an electrode which tends to act as a negative. As the switch terminals advance, the terminal 21 leaves the terminal 12 and makes contact with the terminal 11 before the terminal 23 leaves the terminal 11, the two electrodes 18 and 19 thus acting in parallel to supply current to the motor 14. The cycle of operations just described are then repeated between the taps 6 and 5, 5 and 4 and so on until finally the desired acceleration is attained in the motor and the latter is effected, if the conditions require, by the terminal voltage of the transformer. If it is desired to lessen the speed of the motor or to supply it with energy in lesser amount, the switch elements may be made to traverse the movements described in the reverse direction in which all the intermediate points of voltage will be applied to the motor also in a reverse direction. It must be noted, however, that in this case, since the positive electrode within the vapor converter which has the higher potential tends to supply current, that it will be necessary for the switch terminal 23 to break the circuit every time it leaves a tap terminal. However, since the terminal 18 is always ready to supply the energy to the motor at a slightly lower potential, a comparatively simple circuit breaking device will suffice on the switch terminal 23. I am aware that a similar result has been obtained in some cases by the use of a sliding contact passing from tap to tap and broad enough to bridge two successive taps. Such a switching device is provided with an impedance coil to reduce the current which necessarily results from the short circuiting of a portion of the secondary of the supply transformer. In the device described in Fig. 1, no contact bridges two taps from the transformer and no short circuit current can flow, since neither positive electrode 18 or 19 can act as a negative.

In case the motor is used for propelling vehicles or similar service in which no gradual decrease in speed is required, it is desirable when the motor, running upon the maximum voltage, is to be stopped to open the supply circuit by any suitable circuit breaker, or where the character of the vapor device is suitable, by opening the circuit of the auxiliary transformer 25, 26 at any suitable point.

The organization illustrated in Fig. 1 is adapted to supply to the motor, current of one direction, by utilizing every other alternation of the supply circuit. In Fig. 2, however, the corresponding motor is affected by current of one direction in which both phases of the supply current are utilized. In this second figure of the drawing, the vapor converter is supplied with three main positive electrodes, 31, 32 and 33, connected respectively to contact terminals 34, 35 and 36. The said terminals are adapted to coöperate with other switch terminals having a relative movement as regards the first named terminals, the group of coöperating terminals being shown at 37, 38, 39, 40, 41 and 42. Each of these terminals is connected by a tap with a loop of the transformer secondary 2, or else with a terminal of the said secondary. In the drawing the terminals 37 and 39 are connected to opposite terminals of the secondary.

The operation of accelerating the motor 14 in Fig. 2 is the same in principle as that already described in connection with Fig. 1. To start the motor from rest, the switch terminals 34, 35 and 36 move into the first position in which they connect with the contacts 38 and 42, 36 engaging with 38, and 34 and 35 with 42. The result is the connection electrically of the positive terminal 33 with the lowest voltage tap on one side of the transformer secondary 2 and the positive electrodes 31 and 32 to the corresponding tap on the other side of the secondary 2, so that the lowest voltage impulses attainable are applied to the motor 14. To accelerate the motor 14 further the switch terminals 34, 35, and 36 make contact with the stationary terminals 41, 42 and 38, respectively. The positive electrode 33 is then supplied from the same tap as above. The positive electrode 31 is supplied from the next higher tap from the other side of the secondary 2 and though the positive electrode 32 is connected with the stationary switch terminal 42, it supplies no current, as the positive electrode 31 has a higher voltage. For the next step, the switch terminals 34, 35 and 36 are in contact respectively with stationary terminals 41, 40 and 38 the result being that the positive electrode 32 is supplied from the second tap on one side of the secondary 2 and the positive electrode 31 from the corresponding tap on the other side of the secondary 2. The positive electrode 33, though connected to the stationary terminal 38, supplies no current for reasons already explained. By exactly similar steps the voltage applied to the motor 14 is increased step by step until, if desired, the full terminal voltage of the transformer secondary 2 is applied on both sides to the vapor converter 17.

The statements made in the description of Fig. 1, regarding the reduction of speed of the motor either by proceeding over the steps described in the reverse order or by opening the circuit entirely, apply with equal force to Fig. 2. It is evidently possible, where both sides of a transformer are used to supply all alternations from the source to the motor, that two additional positive electrodes may be used, in which case both sides of the transformer may be stepped up or down at the same time.

The principles described in connection with this invention are applicable to other processes than the acceleration of direct current motors. Any direct current work requiring a variation of potential may make use of this principle and wherever it is convenient and desirable to stop flow of current in a positive electrode by the application of a higher potential either from the same source or other source, this can readily be done by the means of an additional positive terminal above described.

In a divisional application filed by me De-December 4, 1903, Serial Number 183,697, claims are made upon the apparatus described herein. In another divisional application, filed by me November 30th, 1909, Serial Number 530,528 other features of the apparatus described herein relating more particularly to the means for smoothly stepping up the voltage and the arrangement of the keeping alive apparatus, are claimed.

I claim as my invention:

1. In a system of electrical distribution in which suitable direct current translating devices are supplied with variable direct voltage from an alternating source, the method of control which consists in supplying current from the source from a definite potential and rectifying this current, and, increasing the voltage supplied to the translating devices, by substituting for this rectified current, current from a point of higher potential from the source and independently rectifying the second current.

2. The method of increasing the voltage supplied from an alternating source to a direct current translating device, which consists in applying successively higher and higher voltages to the device through a plurality of paths, closing the path from a higher voltage before opening the path from the lower voltage, and rectifying the current in each path independently.

Signed at New York, in the county of New York, and State of New York, this 1st day of September, A. D. 1903.

PERCY H. THOMAS.

Witnesses:
   Wm. H. Capel,
   Thos. H. Brown.